US 8,126,586 B2
Feb. 28, 2012

(12) United States Patent
Bressler et al.

(54) METHODS AND MACHINE TOOLS FOR PROCESSING WORKPIECES

(75) Inventors: Ulrich Bressler, Ditzingen (DE); Peter Demel, Stuttgart (DE); Michael Krutzke, Renningen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 570 days.

(21) Appl. No.: 12/327,995

(22) Filed: Dec. 4, 2008

(65) Prior Publication Data
US 2009/0145273 A1    Jun. 11, 2009

(30) Foreign Application Priority Data

Dec. 6, 2007 (EP) ..................................... 07023628

(51) Int. Cl.
*G06F 19/00* (2006.01)
*B26D 1/00* (2006.01)
*B26D 5/20* (2006.01)

(52) U.S. Cl. ............... 700/192; 700/186; 83/36; 83/257

(58) Field of Classification Search .................... 700/56, 700/60, 61, 159, 160, 169, 173, 174, 186, 700/192, 193, 206; 702/85, 92, 94, 95; 83/36, 83/39, 257, 552
See application file for complete search history.

(56) References Cited

U.S. PATENT DOCUMENTS

| | | | | |
|---|---|---|---|---|
| 4,503,373 A | * | 3/1985 | Nozawa et al. | 700/192 |
| 4,974,165 A | * | 11/1990 | Locke et al. | 700/193 |
| 5,058,029 A | * | 10/1991 | Uemura | 700/176 |
| 5,072,399 A | * | 12/1991 | Laws et al. | 700/187 |
| 5,396,434 A | * | 3/1995 | Oyama et al. | 700/193 |
| 5,435,216 A | | 7/1995 | Murphy | |
| 6,357,977 B1 | * | 3/2002 | Momochi et al. | 700/173 |
| 6,550,118 B2 | * | 4/2003 | Smith et al. | 700/159 |
| 7,487,004 B2 | * | 2/2009 | Shibui | 700/179 |
| 7,715,942 B2 | * | 5/2010 | Gaegauf et al. | 700/186 |
| 7,905,691 B2 | * | 3/2011 | Hon et al. | 700/192 |
| 2002/0197122 A1 | * | 12/2002 | Mizutani et al. | 700/174 |

FOREIGN PATENT DOCUMENTS

| | | |
|---|---|---|
| DE | 3720412 | 12/1987 |
| DE | 3745067 | 3/1997 |
| EP | 0 778 092 | 6/1997 |
| GB | 2 309 001 | 7/1997 |

OTHER PUBLICATIONS

European Search Report from corresponding European Application No. EP 07 02 3628, mailed Apr. 22, 2008, 7 pages.

* cited by examiner

*Primary Examiner* — Charles Kasenge
(74) *Attorney, Agent, or Firm* — Fish & Richardson P.C.

(57) ABSTRACT

The invention relates to methods and machine tools for processing workpieces, in which a workpiece and one or more processing tools are moved relative to each other with a positioning movement, an outward-stroke movement, and a return-stroke movement. In the positioning movement, the workpiece and the processing tool are positioned relative to each other in a positioning direction, in a return-stroke movement the workpiece and the processing tool are moved relative to each other and away from each other in a return-stroke direction transverse to the positioning direction, and in the outward-stroke movement the workpiece and the processing tool are moved relative to each other and towards each other in an outward-stroke direction transverse to the positioning direction. The return-stroke movement and the outward-stroke movement are executed during the positioning movement.

20 Claims, 3 Drawing Sheets

METHODS AND MACHINE TOOLS FOR PROCESSING WORKPIECES

CROSS-REFERENCE TO RELATED APPLICATION

This application claims priority under 35 U.S.C. §119 to European Application No. 07 023 628.6, filed on Dec. 6, 2007. The contents of that priority application are hereby incorporated by reference in their entirety.

TECHNICAL FIELD

The invention relates to methods for processing, especially for cutting and/or for forming, e.g., plate-like workpieces, for example metal sheets. The invention further relates to a machine tool for processing such workpieces using the new methods

BACKGROUND

A processing method and a machine tool are known from U.S. Pat. No. 5,435,216 A, in which a workpiece is processed on a turret punch press at various sites in succession. For that purpose, a first site to be processed on the workpiece is arranged beneath a punch by a movement unit with a positioning movement. Before the positioning movement of the workpiece is completed, the punch is already moved towards the workpiece with an outward-stroke movement by means of a hydraulic stroke drive.

The time at which the outward-stroke movement of the punch is initiated before completion of the positioning movement of the workpiece is selected in such a manner that the punch reaches a position close to the workpiece on completion of the positioning movement. In that position, the underside of the punch is arranged at the level of the upper side of the workpiece. Starting from that position close to the workpiece, the outward-stroke movement is continued with a working stroke in which, with the punch and a die arranged on the opposite side of the workpiece cooperating with each other, a piece is punched from the workpiece.

Subsequently, the punch is moved away from the workpiece with a return-stroke movement. In a first section of the return-stroke movement, the punch is moved back to the position close to the workpiece (working return-stroke). In the working stroke and in the working return-stroke of the punch, the workpiece is not moved by the movement device. As soon as the working return-stroke of the punch has ended, another positioning movement of the workpiece follows in order for the next processing site to be arranged beneath the punch. During the positioning movement of the workpiece, the return-stroke movement is continued and the punch is moved away from the workpiece to a reversing position remote from the workpiece. Before completion of the positioning movement, an outward-stroke movement of the punch then begins again.

In practice, the initiation of the outward-stroke movement of the punch before completion of the workpiece positioning movement is also referred to as "stroke pre-triggering."

The time of stroke pre-triggering is determined by a control unit of the known punch press as the time at which the boundary of a target region defined around the site to be processed on the workpiece arrives beneath the punch. The size of the target region has to be ascertained in advance and stored in the control unit.

SUMMARY

The objects of the present invention include making available new methods and machine tools that permit processing of workpieces with little programming effort.

Accordingly, in one aspect, the invention disclosed herein features methods for processing, e.g., for cutting and/or for forming workpieces, e.g., plate-like workpieces, for example metal sheets, wherein a workpiece and a first processing tool are moved relative to each other with a positioning movement, an outward-stroke movement and a return-stroke movement, wherein the workpiece and the processing tool are positioned relative to each other in a positioning direction in the positioning movement; are moved relative to each other and away from each other in a return-stroke direction transverse to the positioning direction in the return-stroke movement; and are moved relative to each other and towards each other in an outward-stroke direction transverse to the positioning direction in the outward-stroke movement; and wherein the return-stroke movement and the outward-stroke movement are executed during the positioning movement.

The invention is characterized, in part, in that some or all of the parameters for the control of the outward-stroke movement of the processing tool, for example, the time at which the outward-stroke movement is initiated, are ascertained during the process, also referred to herein as "in-process." Thus, there is no need for advance ascertainment of such control parameters and storage thereof in a control unit. In general, the invention is based, in part, upon the realization that the relationships obtained in the return-stroke movement allow inferences to be made regarding the relationships in the outward-stroke movement. For example, in many cases the relationship between return-stroke progress value and simultaneously obtained positioning progress value largely corresponds to the relationship between outward-stroke progress value and simultaneously obtained positioning progress value, so that, by determining the one relationship, the other can be inferred.

For example, the capacity of tool drives and workpiece drives particularly affects the control of the outward-stroke movement. The capacity of these drives correspondingly has an effect on the relationship obtained between return-stroke progress value and positioning progress value. In accordance with the invention, the relationship between return-stroke progress value and positioning progress value is ascertained in the form of a relative return-stroke progress value, and the outward-stroke movement is controlled as a function of the relative return-stroke progress value. In that manner, the capacity of the drives, for example, can be taken into account in the control of the outward-stroke movement directly in-process. Advance ascertainment of possible effects of the capacity of the drives is therefore unnecessary.

Thus, in general, the invention features methods for processing workpieces by initiating a positioning movement to position a workpiece and a first processing tool relative to each other in a positioning direction; initiating a return-stroke movement to move the workpiece and the first processing tool relative to each other and away from each other in a return-stroke direction transverse to the positioning direction; initiating an outward-stroke movement to move the workpiece and the first processing tool relative to each other and towards each other in an outward-stroke direction transverse to the positioning direction; wherein the return-stroke movement and the outward-stroke movement are executed during the positioning movement; simultaneously obtaining progress values of the return-stroke movement and of the positioning movement; ascertaining a relative return-stroke progress value based on the progress value of the return-stroke movement and of the positioning movement; and controlling the outward-stroke movement as a function of the relative return-stroke progress value.

In certain embodiments, the return-stroke movement is initiated no earlier than simultaneously with the initiation of the positioning movement and/or the outward-stroke movement is completed no later than simultaneously with completion of the positioning movement. In some embodiments, the outward-stroke movement is initiated as a function of the relative return-stroke progress value and/or the return-stroke movement is controlled as a function of the relative return-stroke progress value.

In various embodiments, the workpiece and the first processing tool are moved in the positioning movement relative to each other over a total positioning distance, and the return-stroke movement is controlled to be completed no later than when half the total positioning distance of the positioning movement has been reached. In addition, the outward-stroke movement can be initiated as a function of the relative return-stroke progress value from various relative positions in the outward-stroke direction of the workpiece and the first processing tool. The workpiece and the first processing tool can be moved in the positioning movement relative to each other over a total positioning distance, and the progress value of the positioning movement can be ascertained in the form of a proportion of the total positioning distance of the positioning movement already traveled when the ascertainment takes place.

In certain embodiments, the relative return-stroke progress value is ascertained by setting the progress value of the return-stroke movement and the simultaneously obtained progress value of the positioning movement in relation to each other at (i) at least one predetermined progress value of the positioning movement; (ii) at least one predetermined progress value of the return-stroke movement; or (iii) both (i) and (ii). In addition, a predetermined progress value of the return-stroke movement, at which the progress value of the return-stroke movement and the simultaneously obtained progress value of the positioning movement are set in relation to each other to ascertain the relative return-stroke progress value, can be reached upon completion of the maximum possible return-stroke movement. Alternatively, a predetermined progress value of the positioning movement, at which the progress value of the return-stroke movement and the simultaneously obtained progress value of the positioning movement are set in relation to each other to ascertain the relative return-stroke progress value, can be reached when a quarter of the total positioning distance of the positioning movement has been traveled.

The new methods also can further include ascertaining a progress value of the positioning movement at which a predetermined progress value of the return-stroke movement is reached based on the relative return-stroke progress value, and controlling the outward-stroke movement as a function of the progress value of the positioning movement so ascertained. The new methods can also further include controlling the outward-stroke movement as a function of a progress value of the positioning movement ascertained on the basis of the relative return-stroke progress value by determining on the basis of the ascertained progress value of the positioning movement a progress value of the positioning movement at the reaching of which the outward-stroke movement is initiated.

In some embodiments, the new method can further include ascertaining a progress value of the return-stroke movement at which a predetermined progress value of the positioning movement is actually reached based on the relative return-stroke progress value, and controlling the return-stroke movement as a function of the progress value of the return-stroke movement so ascertained.

In certain embodiments, the first processing tool is moved in the return-stroke movement and in the outward-stroke movement, and in other embodiments, after the outward-stroke movement or before the return-stroke movement of the first processing tool, or both, a workpiece processing operation takes place in which a second processing tool is moved towards the first processing tool and the first and second processing tools thereby act on the workpiece arranged between them.

In another aspect, the invention features machine tools for processing workpieces. These machine tools include a first processing tool; a positioning device arranged to position a workpiece and the first processing tool relative to each other in a positioning direction with a positioning movement; a stroke drive arranged to move the first processing tool and the workpiece transversely to the positioning direction and towards each other with an outward-stroke movement and away from each other with a return-stroke movement; and a control device arranged to control the positioning device and the stroke drive such that an outward-stroke movement and a return-stroke movement are executed during a positioning movement; wherein the control device includes an evaluation unit that (i) simultaneously obtains progress values of a return-stroke movement and of a positioning movement; (ii) ascertains a relative return-stroke progress value based on the progress values of the return-stroke movement and of the positioning movement; and (iii) defines parameters for the control device; and wherein the control device controls the outward-stroke movement as a function of the relative return-stroke progress value and based on the parameters.

These machine tools can further include a second processing tool arranged to moved towards the first processing tool and process the workpiece arranged between them. In some embodiments, the control device is arranged to initiate a return-stroke movement no earlier than simultaneously with the initiation of the positioning movement and/or the control device is arranged to complete the outward-stroke movement no later than simultaneously with completion of the positioning movement.

It is advantageous that the new methods and machine tools described herein react flexibly to changes such as variations in the capacity of the drives and are able to carry out adaptation of the outward-stroke movement. Such changes also have an effect on the relationship of positioning movement and return-stroke movement and consequently on the relative return-stroke progress ascertained. Since, in the new methods and tools, the relative return-stroke progress is taken into account in the control of the outward-stroke movement, it is also possible in this way to take changes in the machine tool into account in the control of the outward-stroke movement. To that extent, automatic adaptation of the control of the outward-stroke movement to the actual conditions takes place in every positioning movement.

As noted, in certain embodiments the return-stroke movement is initiated at the earliest simultaneously with the positioning movement and/or, the outward-stroke movement is completed at the latest simultaneously with the positioning movement. In that way, delays in the processing of the workpiece due to the return-stroke movement and the outward-stroke movement are avoided. When the return-stroke movement is initiated simultaneously with the positioning movement and the outward-stroke movement is completed simultaneously with the positioning movement, the duration of the positioning movement is utilized for the outward-stroke movements. This is advantageous, e.g., in cases where the distance between the processing tool and the workpiece transversely to the positioning direction should be as large as possible for as long as possible during the positioning movement.

In other embodiments, the outward-stroke movement is initiated as a function of the relative return-stroke progress. The time at which the outward-stroke movement is initiated determines whether the outward-stroke movement ends on time before completion of the positioning movement. This applies particularly when the total outward-stroke movement takes place in as short a time as possible, i.e., when the machine drives are operated at their maximum capacity during the outward-stroke movement, and accordingly when control of the outward-stroke movement is determined by the maximum capacity of the drives. As a function of the relative return-stroke progress, the control unit then ascertains the "right" start time for the outward-stroke movement. Accordingly, simple control engineering conditions are obtained.

In certain embodiments in which the processing tool and the workpiece are as far apart from each other as possible at every point in time of the positioning movement, the "right" time for initiating the outward-stroke movement is determined not only by the fact that the outward-stroke movement should be completed on time, but also by the fact that the outward-stroke movement should be initiated as late as possible. In certain embodiments, it is possible to ascertain the "right" start time using simple control engineering means.

In other embodiments, the return-stroke movement is controlled as a function of the relative return-stroke progress. This makes possible an intervention of the control unit in the movement sequence of the processing tool already during the return-stroke movement and hence at a very early stage. In particular, if the return-stroke movement is decelerated "prematurely, it is possible for the starting position for the outward-stroke movement to be redefined in an anticipatory manner.

In other embodiments, the new methods ensure in a simple manner that the return-stroke movement and the outward-stroke movement end with the completion of the positioning movement.

In certain embodiments, the outward-stroke movement is initiated as a function of the relative return-stroke progress from various relative positions of the workpiece and the processing tool assumed in the outward-stroke direction. By virtue of the fact that the starting position of the outward-stroke movement remote from the workpiece is not pre-defined in an unchangeable manner, but may be (re)defined in-process, a method as described herein is obtained that is highly adaptable to the particular conditions obtained.

In various embodiments, the progress of the positioning movement is ascertained in the form of a standardized travel distance that is defined as being a proportion of a total positioning distance of the positioning movement already traveled when the ascertainment takes place. Advantageously, the control conditions and any pre-determined values for the progress of the positioning movement can accordingly be stored in the control unit in general form for every positioning movement, irrespective of the particular absolute total positioning distance of the positioning movement.

Simple control engineering conditions are also a characteristic of certain embodiments of the invention in which the ascertainment of the relative return-stroke progress takes place at a predetermined progress of the positioning movement and/or at a predetermined progress of the return-stroke movement.

A useful value for a predetermined progress of the return-stroke movement is that progress of the return-stroke movement which is reached with the completion of the maximum possible return-stroke movement. The selection of this return-stroke progress value is based on the assumption that the outward-stroke movement starting from the end position of the maximum possible return-stroke movement takes just as long as the preceding return-stroke movement.

A useful value for a predetermined progress of the positioning movement is attained in some embodiments, at a quarter of the total positioning distance. From the progress value of the return-stroke movement when a quarter of the total positioning distance has been reached, it is possible to infer the end position of the return-stroke movement when half the total positioning distance has been reached.

Various embodiments of the invention are distinguished by a simple control configuration. In a simple manner, the control of the outward-stroke movement takes place as a function of the relative return-stroke progress value by reference to a progress value of the positioning movement ascertained on the basis of the relative return-stroke progress value.

The same applies to methods described herein with regard to the control of the return-stroke movement. That control takes place as a function of the relative return-stroke progress value by reference to a progress value of the return-stroke movement ascertained on the basis of the relative return-stroke progress value.

If the processing tool is moved in the return-stroke movement and in the outward-stroke movement, an embodiment of the invention that is especially advantageous for practical application is obtained.

In certain embodiments, in the return-stroke movement and in the outward-stroke movement, a processing tool that is not moved in the preceding or following workpiece processing operation (passive processing tool) is moved. The return-stroke movement and the outward-stroke movement of the passive processing tool serve in this case to avoid collisions between the passive processing tool and the workpiece. In particular, scratching of the workpiece by the passive processing tool during the positioning movement can be effectively prevented.

BRIEF DESCRIPTION OF DRAWINGS

The invention will be described in detail hereinafter with reference to schematic illustrations of illustrative embodiments.

DETAILED DESCRIPTION

Figure 1:
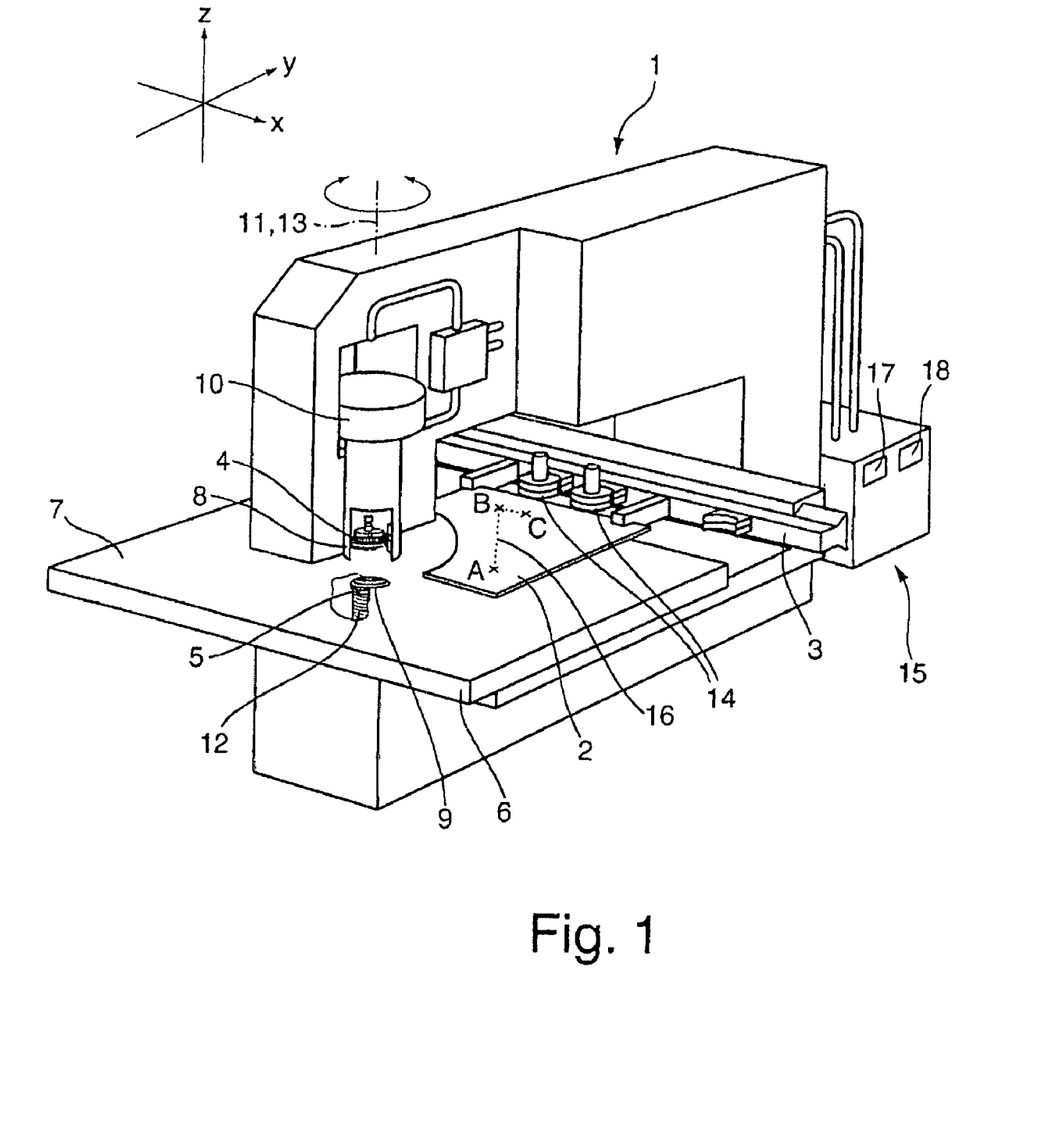
FIG. 1 is a schematic three-dimensional view that shows a punch forming machine for processing metal sheets.

FIG. 1 shows a machine tool for cutting and/or for forming metal sheets, in the form of a punch forming machine 1. A metal sheet 2 to be processed is positioned in a horizontal plane between processing tools, more specifically between an upper tool 4 and a lower tool 5 of the punch forming machine 1, by means of a positioning device in the form of coordinate guide 3. The horizontal positioning plane extends parallel to the X/Y plane of the coordinate system shown in FIG. 1 and is defined by a workpiece table 6 which forms a horizontally extending workpiece support surface 7 for the underside of the work-piece.

The upper tool 4 and the lower tool 5 are secured in tool holders 8 and 9 on the machine. The upper tool holder 8 and therewith also the upper tool 4 supported therein can be raised and lowered by means of an upper stroke drive 10 along a stroke axis 11 extending parallel to the Z-axis of the coordinate system shown in FIG. 1.

In a comparable manner, a lower stroke drive 12, which is partially concealed in FIG. 1, serves to raise and lower the lower tool holder 9 and the lower tool 5 held therein along the stroke axis 11.

Both tool holders 8, 9 are furthermore rotationally adjustable by means of tool rotation drives, not shown in FIG. 1, about a tool rotation axis 13 which is identical to the stroke axis 11. By means of the tool rotation drives, the processing tools 4, 5 are transferred to different rotational positions about the tool rotation axis 13 depending on the processing task.

Provided on the coordinate guide 3 there is a linear magazine with further processing tools 14 which may be interchanged with the upper tool 4 and the lower tool 5 if required.

All of the drives of the punch forming machine 1 are controlled by a numerical control unit 15 serving as a control device. Details of the numerical control unit 15 will be explained hereinafter with reference to the sequences of movement in a workpiece processing operation.

Figure 2:
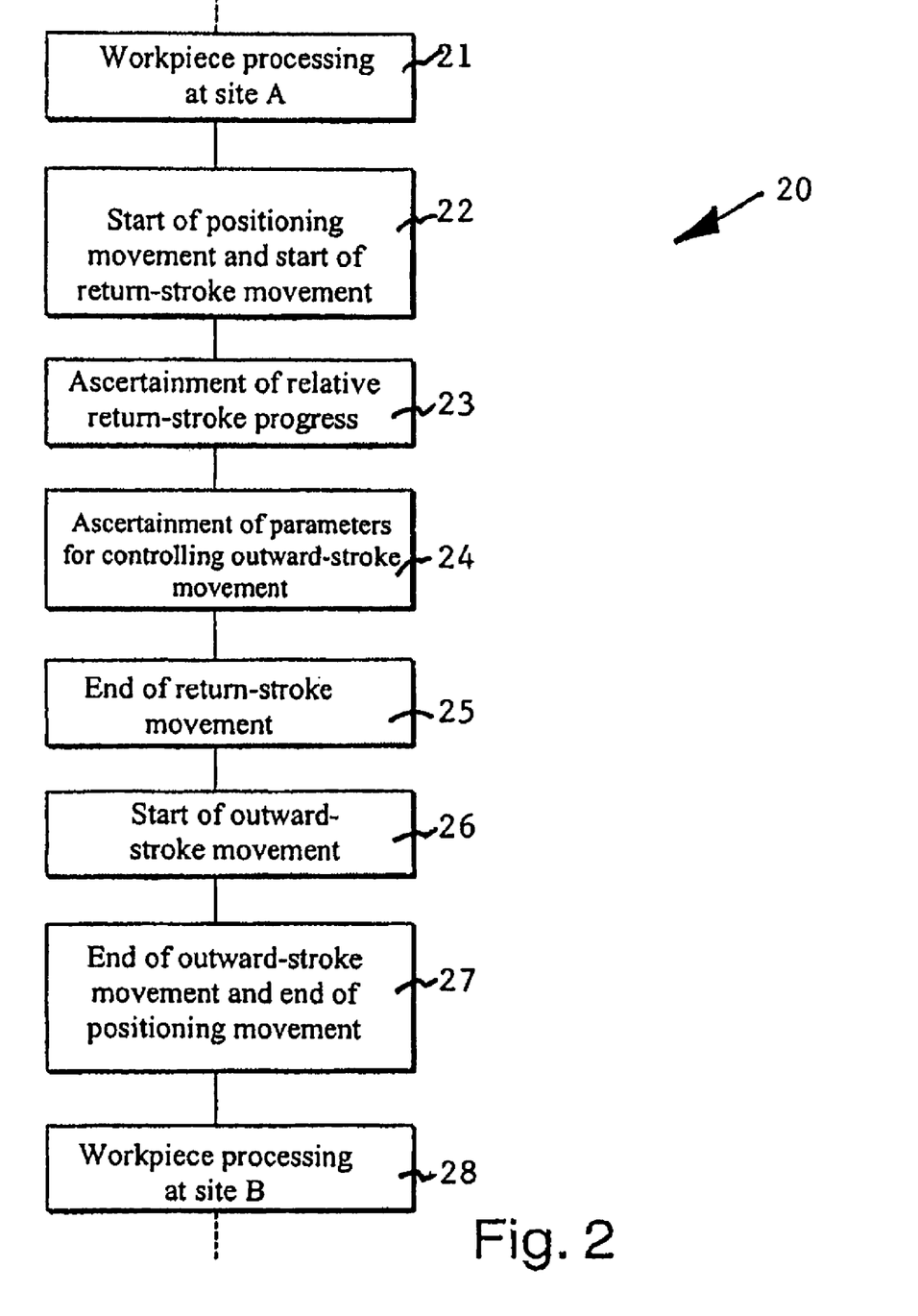
FIG. 2 is a flow chart that shows the sequence of a workpiece processing operation comprising a positioning movement, a return-stroke movement and an outward-stroke movement.

FIG. 2 is a flow chart that shows an illustrative sequence of a workpiece processing operation 20 on the punch forming machine 1 shown in FIG. 1. At the start of the workpiece processing operation, the metal sheet 2 is positioned in such a manner that a site A to be processed on the metal sheet 2 is arranged between the processing tools 4, 5 (step 21). In that position, the metal sheet 2 is processed at site A by means of the upper tool 4 and the lower tool 5.

During processing, the lower tool 5 is arranged in a reference position close to the workpiece, in which the upper side of the lower tool 5 is flush with the workpiece support surface 7 formed by the workpiece table 6. Workpiece processing is performed by moving the upper tool 4 by means of the upper stroke drive 10 along the stroke axis 11 towards the stationary lower tool 5. Subsequently, the upper tool 4 is raised along the stroke axis 11. Accordingly, the lower tool 5 is not moved during the processing operation.

After the processing operation at site A, the metal sheet 2 is moved by means of the coordinate guide 3 with a positioning movement relative to the upper tool 4 and the lower tool 5. By way of example a second site B on the metal sheet 2 is shown in FIG. 1, which arrives between the processing tools 4, 5 in the positioning movement. For this, the metal sheet 2 is moved over a total positioning distance 16 shown by a dashed line in FIG. 1.

To avoid scratching of the underside of the metal sheet by the lower tool 5 during the positioning movement, starting from the reference position close to the workpiece the lower tool 5 is lowered with respect to the metal sheet 2. The return-stroke movement of the lower tool 5, which is executed for that purpose, takes place in a return-stroke direction which extends along the stroke axis 11 and hence transversely to the direction of the positioning movement. On completion of the return-stroke movement, the lower tool 5 assumes an end position remote from the workpiece.

Already during the positioning movement of the metal sheet 2 and before workpiece processing at site B of the metal sheet 2, the lower tool 5 is moved back from the end position remote from the workpiece towards the reference position close to the workpiece with an outward-stroke movement along the stroke axis 11.

The coordinate guide 3 and the lower stroke drive 12 are controlled by means of the numerical control unit 15 in such a manner that the return-stroke movement of the lower tool 5 is initiated at the earliest simultaneously with the positioning movement of the metal sheet 2 and in such a manner that the outward-stroke movement of the lower tool 5 is completed at the latest simultaneously with the positioning movement of the metal sheet 2.

Preferably, the return-stroke movement of the lower tool 5 is initiated simultaneously with the positioning movement of the metal sheet 2 (step 22 in FIG. 2) and the outward-stroke movement of the lower tool 5 is completed simultaneously with the positioning movement of the metal sheet 2. The lower tool 5 is consequently as far away as possible from the underside of the metal sheet during the entire positioning movement of the metal sheet 2.

During the positioning movement of the metal sheet 2, a progress-ascertaining unit 17 of the numerical control unit 15 ascertains the progress of the return-stroke movement of the lower tool 5 and the progress of the positioning movement of the metal sheet 2. The ascertained progress of the return-stroke movement and the simultaneously obtained progress of the positioning movement are set in relation to each other by an evaluation unit 18 of the control unit 15. In that manner, the progress of the return-stroke movement is determined as a function of the progress of the positioning movement (relative return-stroke progress) (step 23 in FIG. 2).

On the basis of the relative return-stroke progress so ascertained, the evaluation unit 18 defines or ascertains parameters for the control of the outward-stroke movement (step 24 in FIG. 2), for example a start condition for the outward-stroke movement, of the lower tool 5, which start of the outward-stroke movement (step 26 in FIG. 2) follows the end of the return-stroke (step 25 in FIG. 2). By means of the control unit 15, the outward-stroke movement of the lower tool 5 is then controlled in accordance with those parameters. Accordingly, the outward-stroke movement of the lower tool 5 is controlled as a function of the relative return-stroke progress, i.e., as a function of the relationship obtained between the return-stroke progress and the positioning progress. The end of the outward-stroke movement and the end of the positioning movement then occur in step 27 (FIG. 2). Workpiece processing at site B can then begin (step 28 in FIG. 2).

Using a numerical processing program as a basis, the numerical control (NC) device 15 generates, in very short, consecutive cycle times, desired position values for the drives of the punch forming machine 1 used to move the upper tool 4, the lower tool 5, and the metal sheet 2. Those drives 10 and 12, and coordinate guide 3, of the punch forming machine 1 are configured in such a manner that they are able to attain the specified desired position values promptly without significant deviations. Accordingly, the specified desired position values largely correspond to the actual position values obtained.

As is well known in this field, the NC device 15 includes an operating system having a computer and an operating device. The operating device has a display unit (e.g., a screen) and an input unit, e.g., in the form of a keyboard, a touch panel, or the like. Furthermore the NC device includes a machine control board for manual operation of the machine tool and NC units. In particular, the punch forming machines described herein are controlled by means of known control programs that are generated using programming systems or manually on the operating device of the machine. The term "control program" includes the NC-program and all technology data stored out of the NC-program in external data stores. Programming systems include basic and special NC-functions and know the technology data required and the rules for the processing operating. Consequently they are able to automatically define the processing operations and to generate control programs. In the control program the tools, e.g., the upper and lower tools, to be used and the punching forces required are defined.

Programming systems can be in the form of special programming systems provided by the machine manufactures (e.g., TruToPs by TRUMPF) or in the form of machine independent programming systems. The common feature of all programming systems is the generation of a control program for a machine tool, which is transferred from the operating system to the numerical control units where it is executed line by line.

The desired position values are specified, inter alia, for the coordinate guide 3 and the lower stroke drive 12. The positioning movement of the metal sheet 2 and the return-stroke movement and outward-stroke movement of the lower tool 5 are executed by means of those drives.

On the basis of the desired position values that are specified for the positioning movement by the control unit 15 and passed to the coordinate guide 3, the progress-ascertaining unit 17 of the control unit 15 calculates the progress value of the positioning movement. For this, the distance traveled by the metal sheet 2 from the beginning of the positioning movement is determined from a desired position value for the coordinate guide 3 that is correlated with the time at which the progress ascertainment takes place. From this, in turn, the progress of the positioning movement is calculated in the form of the proportion of the total positioning distance of the positioning movement traveled when the ascertainment takes place. The progress value of the positioning movement so ascertained is also referred to as the standardized travel distance.

For example, at a progress value of the positioning movement, or at a standardized travel distance, of $s=0.5$, half of the total positioning distance has been traveled. At a progress value of the positioning movement, or at a standardized travel distance, of $s=1.0$, the total positioning distance has been traveled in its entirety and hence the positioning movement has been completed (see FIGS. 3, 4).

The progress value of the return-stroke movement of the lower tool 5 is calculated by the progress-ascertaining unit 17 on the basis of the desired position value for the lower stroke drive 12 specified by the control unit 15 for the time at which the ascertainment takes place. From that desired position value, the progress-ascertaining unit 17 then ascertains the return-stroke progress value in the form of the instantaneous position of the lower tool 5 along the stroke axis 12 relative to the reference position of the lower tool 5, that is to say, relative to that position of the lower tool 5 in which the upper side of the lower tool 5 is flush with the workpiece support surface 7.

At a progress value of the return-stroke movement of $z=0$, the lower tool 5 accordingly assumes the reference position. At a progress value of $z=zmax$, the lower tool 5 will have executed the maximum possible return-stroke movement. The maximum possible return-stroke movement ends at a structurally defined lower end position.

Figure 3:
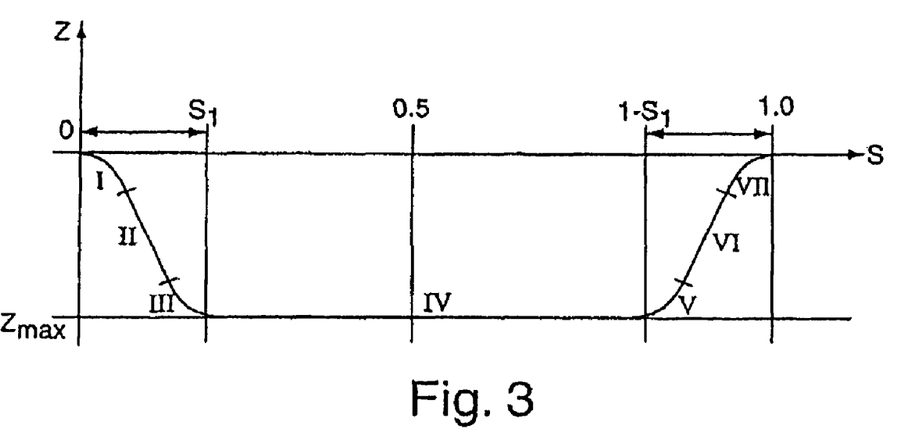
FIG. 3 is a graph that shows relative positions of a processing tool and a workpiece along the Z-axis from FIG. 1 as a function of the standardized travel distance s in a first positioning movement.
Figure 4:
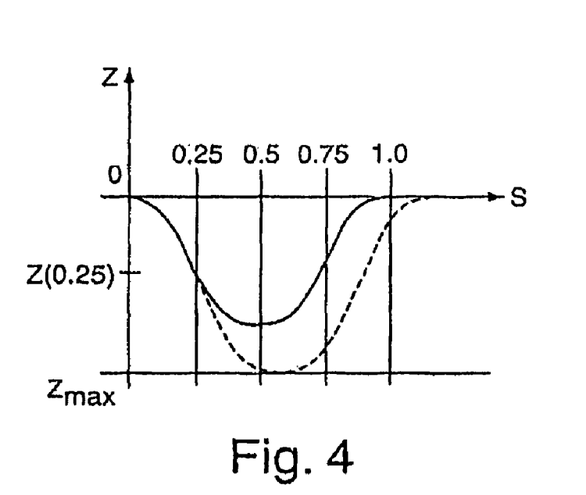
FIG. 4 is a graph that shows relative positions of a processing tool and a workpiece along the Z-axis from FIG. 1 as a function of the standardized travel distance s in a second positioning movement.

FIGS. 3 and 4 show the progress values of the return-stroke movement of the lower tool 5 in relation to the simultaneously obtained progress values of the positioning movement, exemplified by two different types of positioning movement in a workpiece processing operation proceeding in accordance with FIG. 2. The progress values of the return-stroke movement is shown as a function of the simultaneously obtained progress values of the positioning movement.

FIGS. 3 and 4 accordingly show in each case the curve of the relative return-stroke progress value. The progress value of the outward-stroke movement, which follows the return-stroke, is shown in a corresponding manner (relative outward-stroke progress value).

In the case of the positioning movement illustrated in FIG. 3, a "long" positioning movement is involved, during which the lower tool 5 executes a structurally defined maximum possible return-stroke movement ($z=zmax$) and the lower tool 5 remains in the lower end position for some time before the outward-stroke movement of the lower tool 5 is initiated. Such a situation is obtained, for example, when, in FIG. 1, after site A, site B of the metal sheet 2 is moved between the upper tool 4 and the lower tool 5.

By means of the control unit 15, the lower tool 5 is controlled during the positioning movement in such a manner that seven different movement sections I to VII are obtained for the movement of the lower tool 5, the disposition of which may be seen from FIG. 3. The return-stroke movement of the lower tool 5 comprises the movement sections I to III. The outward-stroke movement of the lower tool 5 comprises the movement sections V to VII. During the movement section IV, the lower tool 5 is retracted to the maximum extent relative to the underside of the metal sheet 2.

During the first movement section I, the lower tool 5 is accelerated in the return-stroke direction. During the second movement section II, the lower tool 5 moves at constant speed in the return-stroke direction. Before reaching the lower end position, the lower tool 5 is then decelerated during the movement section III and subsequently remains in the lower end position during the movement section IV.

The outward-stroke movement comprises, in turn, a first movement section, during which the lower tool 5 is accelerated in the outward-stroke direction (movement section V), a movement section during which the lower tool 5 is moved at constant speed in the outward-stroke direction (movement section VI) and a final movement section during which the lower tool 5 is decelerated (movement section VII).

To move the lower tool 5 away from the metal sheet 2 as quickly as possible and, in addition, initiate the outward-stroke movement as late as possible, the control unit 15 controls the return-stroke and outward-stroke movements of the lower tool 5 in such a manner that the stroke drive 12 is operated at maximum output power, i.e., the lower tool 5 is accelerated to the maximum extent possible (movement sections I and IV), is moved at the maximum possible speed (movement sections II and VI), and is decelerated to the maximum extent possible (movement sections III and VII).

The control unit 15 controls the outward-stroke movement of the lower tool 5 as a function of the relative return-stroke progress value. In particular, the control unit 15 initiates the outward-stroke movement of the lower tool 5 as a function of the relative return-stroke progress value.

For that purpose, the evaluation unit 18 of the control unit 15 ascertains the relative return-stroke progress at a progress of the return-stroke movement that is reached with the completion of the maximum possible return-stroke movement, i.e., when the return-stroke progress value attains the predetermined value of $z=zmax$ (see, FIG. 4).

From the relative return-stroke progress value so ascertained, the progress value of the positioning movement actually obtained at that point in time ($s=s1$) is determined. The outward-stroke movement is then initiated by the control unit 15 when the positioning movement reaches a progress value calculated by the evaluation unit 18 of s=1−s1. It is assumed here that, in the present case, the same amount of the standardized travel distance is required for the outward-stroke movement as is required for the return-stroke movement. This ensures that the outward-stroke movement is not initiated earlier than is necessary and nor is it initiated too late.

In general, the calculations of the evaluation unit 18 are based on the realization that the relationships in the return-stroke movement correspond to the relationships in the outward-stroke movement, and therefore the relative outward-stroke progress value to be expected may be inferred in a simple manner from the relative return-stroke progress value.

FIG. 4 shows the curve of the relative return-stroke progress value and the curve of the relative outward-stroke progress value in the case of a "short" positioning movement, in which only a return-stroke movement that is smaller than the maximum possible return-stroke movement can be executed. For example, a positioning movement between the processing sites B and C shown in FIG. 1 constitutes a "short" positioning movement.

Generally, that is to say, also in the case of the conditions illustrated in FIG. 3, the evaluation unit 18 of the control unit 15 determines the relative return-stroke progress value at a predetermined progress value of the positioning movement of s=0.25 and ascertains therefrom the progress value of the return-stroke movement actually obtained at that point in time. If the progress value of the return-stroke movement obtained at that point in time is equal to or greater than half the maximum possible return-stroke progress value (z(0.25) ≧zmax/2), no particular intervention by the control unit 15 takes place during the return-stroke movement.

In the case of the positioning movement illustrated in FIG. 4, however, the return-stroke progress value so ascertained is smaller than half the maximum possible return-stroke progress value (z(0.25)<zmax/2). For that reason, the maximum possible return-stroke movement cannot yet have been completed at a progress value of the positioning movement of s=0.5.

By reference to the curve of a movement of the lower tool 5 shown by a dashed line in FIG. 4 it becomes clear that the maximum possible return-stroke movement (z=zmax) would not be reached until a progress of the positioning movement that lies between s=0.5 and s=0.75 and that is thus greater than s=0.5. It also becomes clear from FIG. 4 that, without intervention by the control unit 15, an outward-stroke movement initiated at z=zmax would not end until after completion of the positioning movement of the metal sheet 2. That would involve delaying the subsequent workpiece processing operation.

To avoid such a delay, the control unit 15 ensures that the return-stroke movement is decelerated "prematurely," so that the return-stroke movement is completed at the latest when half the total positioning distance (s=0.5) is reached. The progress value of the return-stroke movement in the case of this newly defined end position of the return-stroke movement is determined by the evaluation unit 18 as being double the progress value of the return-stroke movement obtained at a progress value of the positioning movement of s=0.25. The outward-stroke movement of the lower tool 5 is then executed starting from the newly defined end position of the return-stroke movement.

As shown in FIGS. 3 and 4, the outward-stroke movement is initiated by means of the control unit 15 as a function of the relative return-stroke progress value from various positions of the lower tool 5 assumed relative to the metal sheet 2 in the outward-stroke direction. In both cases, the outward-stroke movement of the lower tool 5 ends simultaneously with the positioning movement of the metal sheet 2 (step 28 in FIG. 2).

As has already been explained above in connection with FIG. 2, the metal sheet 2 is processed with the processing tools 4, 5 cooperating with each other, with the lower tool 5 being disposed unmoved in its reference position during the processing operation.

The outward-stroke movements and return-stroke movements of the lower tool 5 accordingly constitute merely positioning movements in the sequences so far described.

As a departure from this, the lower tool 5 may also be moved with an outward-stroke movement in the workpiece processing operation. In that case, the lower tool 5 is moved by means of the lower stroke drive 12 beyond the reference position and towards the upper tool 4 (working outward-stroke movement) and is subsequently moved away from the upper tool 4 (working return-stroke movement).

In a workpiece processing operation of that kind, in which the lower tool 5 executes a working stroke and a working return-stroke, and for cases where the metal sheet 2 is not moved in the positioning plane during the working stroke and the working return-stroke of the lower tool 5 (for example in the case of punching), it is also possible for only those components of the total outward-stroke movement and of the total return-stroke movement in which the lower tool 5 is solely positioned relative to the metal sheet 2 and in which the lower tool 5 is not in engagement with the metal sheet 2 to be controlled as described above. In that case, of the total outward-stroke movement and the total return-stroke movement, only the mentioned positioning components of the outward-stroke movement and of the return-stroke movement of the lower tool 5 are executed during the positioning movement of the metal sheet 2.

It is otherwise also possible, as an alternative or in addition to the above sequences of operations, for the upper tool 4 to be moved with a return-stroke movement and with an outward-stroke movement that are controlled analogously to the described return-stroke and outward-stroke movements of the lower tool 5.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing workpieces, the method comprising
   initiating a positioning movement to position a workpiece and a first processing tool relative to each other in a positioning direction;
   initiating a return-stroke movement to move the workpiece and the first processing tool relative to each other and away from each other in a return-stroke direction transverse to the positioning direction;
   initiating an outward-stroke movement to move the workpiece and the first processing tool relative to each other and towards each other in an outward-stroke direction transverse to the positioning direction; wherein the return-stroke movement and the outward-stroke movement are executed during the positioning movement;
   simultaneously obtaining progress values of the return-stroke movement and of the positioning movement;
   ascertaining a relative return-stroke progress value based on the progress values of the return-stroke movement and of the positioning movement, wherein the relative return-stroke progress value represents progress of the return-stroke movement as a function of progress of the positioning movement; and controlling the outward-stroke movement as a function of the relative return-stroke progress value.

2. A method of claim 1, wherein the return-stroke movement is initiated no earlier than simultaneously with the initiation of the positioning movement.

3. A method of claim 1, wherein the outward-stroke movement is completed no later than simultaneously with completion of the positioning movement.

4. A method of claim 1, wherein the outward-stroke movement is initiated as a function of the relative return-stroke progress value.

5. A method of claim 1, wherein the return-stroke movement is controlled as a function of the relative return-stroke progress value.

6. A method of claim 1, wherein the workpiece and the first processing tool are moved in the positioning movement relative to each other over a total positioning distance, and the return-stroke movement is controlled to be completed no later than when half the total positioning distance of the positioning movement has been reached.

7. A method of claim 1, wherein the outward-stroke movement is initiated as a function of the relative return-stroke progress value from various relative positions in the outward-stroke direction of the workpiece and the first processing tool.

8. A method of claim 1, wherein the workpiece and the first processing tool are moved in the positioning movement relative to each over a total positioning distance, and the progress value of the positioning movement is ascertained in the form of a proportion of the total positioning distance of the positioning movement already traveled when the ascertainment takes place.

9. A method of claim 1, wherein the relative return-stroke progress value is ascertained by setting the progress value of the return-stroke movement and the simultaneously obtained progress value of the positioning movement in relation to each other at (i) at least one predetermined progress value of the positioning movement; (ii) at least one predetermined progress value of the return-stroke movement; or (iii) both (i) and (ii).

10. A method of claim 1, wherein a predetermined progress value of the return-stroke movement, at which the progress value of the return-stroke movement and the simultaneously obtained progress value of the positioning movement are set in relation to each other to ascertain the relative return-stroke progress value, is reached upon completion of the maximum possible return-stroke movement.

11. A method of claim 1, wherein a predetermined progress value of the positioning movement, at which the progress value of the return-stroke movement and the simultaneously obtained progress value of the positioning movement are set in relation to each other to ascertain the relative return-stroke progress value, is reached when a quarter of a total positioning distance of the positioning movement has been traveled.

12. A method of claim 1, further comprising ascertaining a progress value of the positioning movement at which a predetermined progress value of the return-stroke movement is reached based on the relative return-stroke progress value, and controlling the outward-stroke movement as a function of the progress value of the positioning movement so ascertained.

13. A method of claim 1, further comprising controlling the outward-stroke movement as a function of a progress value of the positioning movement ascertained on the basis of the relative return-stroke progress value by determining on the basis of the ascertained progress value of the positioning movement a progress value of the positioning movement at the reaching of which the outward-stroke movement is initiated.

14. A method of claim 1, further comprising ascertaining a progress value of the return-stroke movement at which a predetermined progress value of the positioning movement is actually reached based on the relative return-stroke progress value, and controlling the return-stroke movement as a function of the progress value of the return-stroke movement so ascertained.

15. A method of claim 1, wherein the first processing tool is moved in the return-stroke movement and in the outward-stroke movement.

16. A method of claim 1, wherein after the outward-stroke movement or before the return-stroke movement of the first processing tool, or both, a workpiece processing operation takes place in which a second processing tool is moved towards the first processing tool and the first and second processing tools thereby act on the workpiece arranged between them.

17. A machine tool for processing workpieces comprising a first processing tool;
a positioning device arranged to position a workpiece and the first processing tool relative to each other in a positioning direction with a positioning movement;
a stroke drive arranged to move the first processing tool and the workpiece during the positioning movement and transversely to the positioning direction and towards each other with an outward-stroke movement and away from each other with a return-stroke movement; and
a control device arranged to control the positioning device and the stroke drive such that an outward-stroke movement and a return-stroke movement are executed during the positioning movement;
wherein the control device comprises an evaluation unit that
simultaneously obtains progress values of the return-stroke movement and of the positioning movement;
ascertains a relative return-stroke progress value based on the progress values of the return-stroke movement and of the positioning movement, wherein the relative return-stroke progress value represents the progress of the return-stroke movement as a function of the progress of the positioning movement; and
defines parameters for the control device; and
wherein the control device controls the outward-stroke movement as a function of the relative return-stroke progress value and based on the parameters.

18. The machine tool of claim 17, further comprising a second processing tool arranged to moved towards the first processing tool and process the workpiece arranged between them.

19. The machine tool of claim 17, wherein the control device is arranged to initiate a return-stroke movement no earlier than simultaneously with initiation of the positioning movement.

20. The machine tool of claim 17, wherein the control device is arranged to complete the outward-stroke movement no later than simultaneously with completion of the positioning movement.

* * * * *